May 2, 1961 D. P. FLOOD 2,982,963

RADIO FREQUENCY PHASE SHIFTING BAND PASS NETWORK

Filed Nov. 18, 1955 3 Sheets-Sheet 1

INVENTOR.
David P. Flood
BY Ezekiel Wolf
his attorney.

May 2, 1961 D. P. FLOOD 2,982,963

RADIO FREQUENCY PHASE SHIFTING BAND PASS NETWORK

Filed Nov. 18, 1955 3 Sheets-Sheet 2

INVENTOR.
David P. Flood
BY
[signature]
his Attorney

May 2, 1961 D. P. FLOOD 2,982,963

RADIO FREQUENCY PHASE SHIFTING BAND PASS NETWORK

Filed Nov. 18, 1955 3 Sheets-Sheet 3

INVENTOR.
David P. Flood
BY Ezekiel Wolf
his Attorney

United States Patent Office 2,982,963

Patented May 2, 1961

2,982,963

RADIO FREQUENCY PHASE SHIFTING BAND PASS NETWORK

David P. Flood, 299 Atlantic Ave., Natick, Mass.

Filed Nov. 18, 1955, Ser. No. 547,606

10 Claims. (Cl. 343—853)

This invention relates to radio frequency networks which are particularly useful, for example, at VHF and UHF frequencies.

One object of this invention is to provide a substantially reflectionless radio frequency selective phase shifting network which, when connected between a source of radio frequency power and a load, has a slowly varying effective electrical length L over a wide band of frequencies, except within a very narrow frequency band contained within the wide band where the effective electrical length of the network is substantially L plus a half wave-length.

Another object of this invention is to provide certain useful networks comprising the phase changing selective phase shifting network referred to above. More particularly, one of the objects of the invention is a means for efficiently combining the outputs of two transmitters into two transmission lines carrying similar signals whereby two sections of an antenna array may be similarly energized so that the antenna has a gain corresponding to the two sections acting together.

Still another object of the present invention is a means for combining the outputs of two transmitters into a single coaxial transmission line.

The networks of this invention are useful in the broadcasting of television signals because they enable one to combine the outputs of the aural and of the visual transmitters without introducing rapidly varying envelope phase delay. These networks have low loss, introduce negligible reflection and present substantially constant resistive impedances to both transmitters over a wide frequency range.

Figure 4:
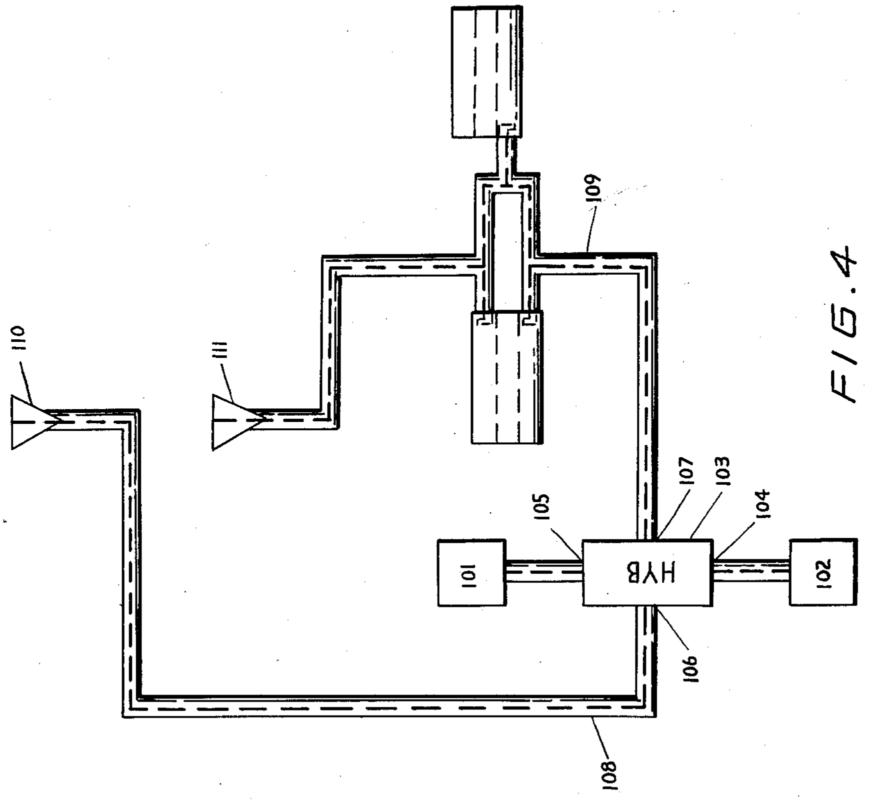
Figure 1:
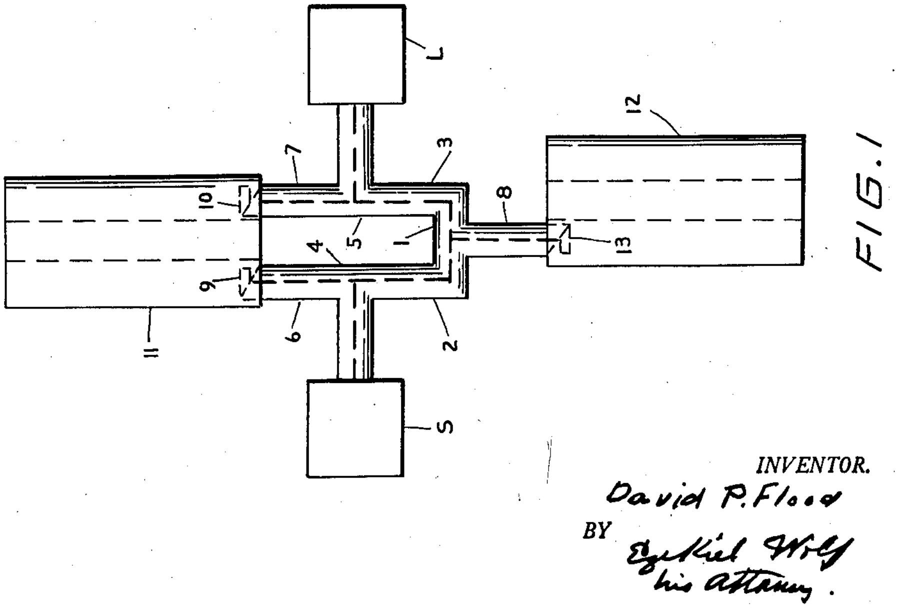
Figure 2:
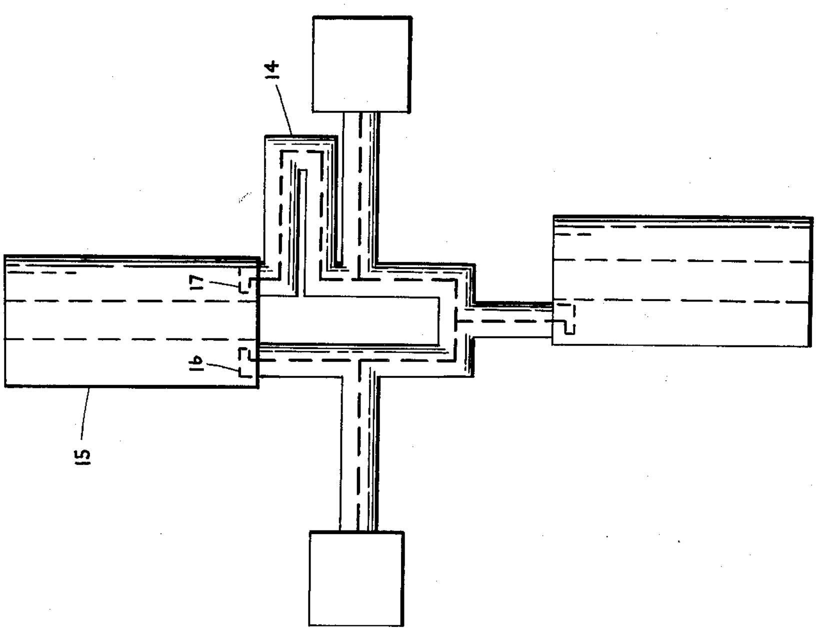
Figure 3:
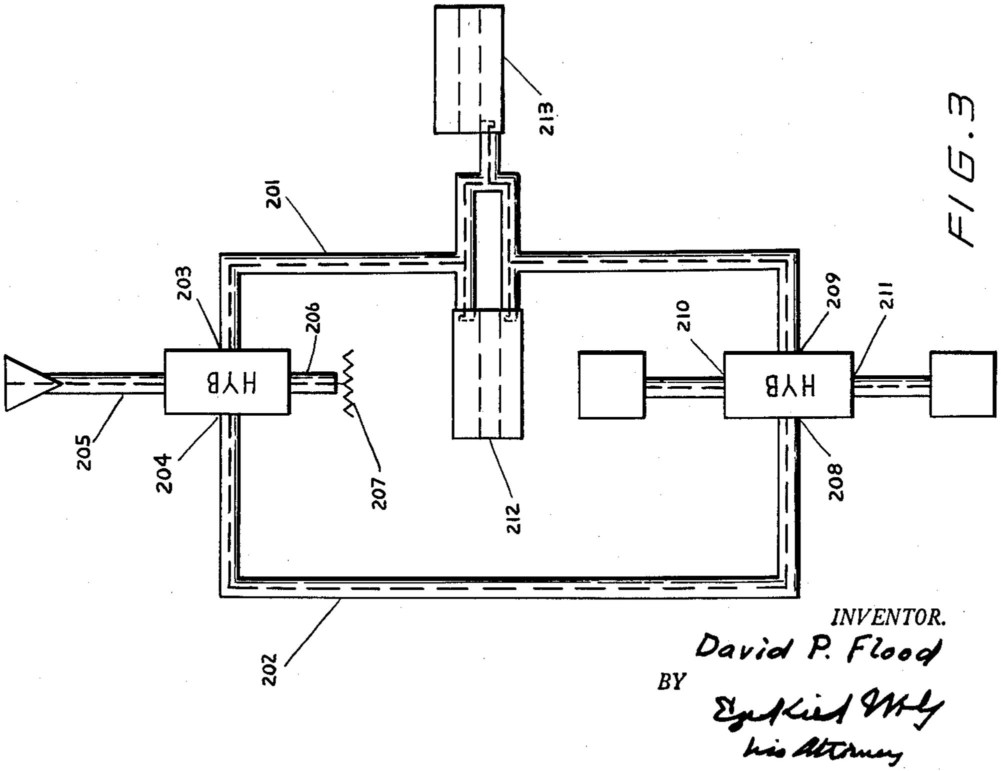
Figure 5:
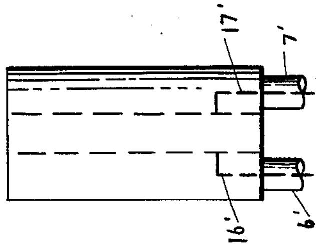
Figure 6:
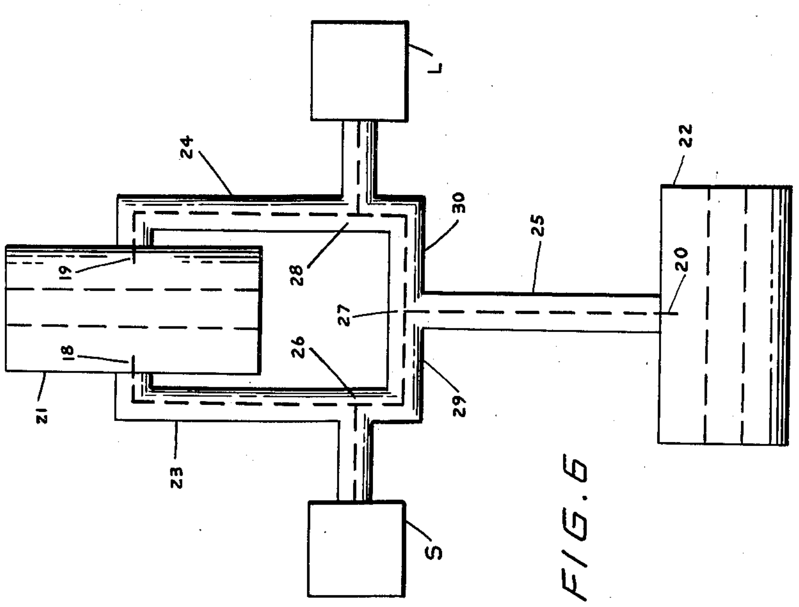

Other purposes and advantages of the present invention will be better understood from a description in the specification as set forth below in which:

Figure 1 is shows diagrammatically a network for selective phase shifting as herein employed, Figures 2, 3 and 4 show various embodiments of the above network in diplexer circuits, Figure 5 shows a modification of a detail of the invention, and Figure 6 shows a further modification of Figure 1.

One embodiment of my invention is described in connection with Figure 1 showing a network which may be connected to a source of high frequency electromagnetic energy S at one termination and a means of accepting this energy, such as an antenna or a load L, at the other termination. The network comprises two branches, one made up of wave transmission conduits such as line sections 6 and 7 with a resonant cavity 11 coupled in series with the line such that energy passing from line section 6 to line section 7 or vice versa would pass through cavity 11, and the other branch made up of wave transmission conduits such as line sections 2 and 3 to which at junction 1 a resonant cavity 12 is coupled through line section 8. Cavity 11 may be called a series cavity while cavity 12 may be called a shunt cavity. Each of the two cavities may comprise a cylindrical, polygon or other type of housing with a coaxial or non-coaxial tube extending from one end of the housing to the other, forming inner conductors for the cavities. The two cavities are tuned to resonate at approximately the same frequency, for example, the aural carrier frequency of a television broadcast station. The two cavities 11, 12 may be coupled to the transmission line sections 6, 7, 8 by means of coupling loops such as 9, 10, 13 which are extensions of the inner conductors of transmission lines which protrude into the cavity and are short-circuited to the outer conductors of said lines or by any other convenient method of coupling, whether capacitive or inductive. The electrical length of the transmission line section 8, together with the coupling loop 13, as a unit, is substantially one-quarter wavelength, or odd multiples thereof, at the resonant frequency of the cavities. Each of the branch lines 2 and 3 is one-quarter wavelength or odd multiples thereof long as measured between junctions 1 and 4 and between junctions 1 and 5 respectively at the resonant frequencies of the cavities. The transmission line section 6 with the coupling loop 9 as well as the transmission line section 7 with the coupling loop 10 are each electrically equivalent to one-quarter wavelength or odd multiple thereof at the resonant frequency of the cavities.

The coupling loops 9 and 10 in cavity 11 are oriented in such a manner that there is a 180° phase reversal at resonance of the cavity, by virtue of the fact that one loop is grounded nearer the inner conductor of the cavity 11. The characteristic impedance of each of the arms is preferably equal to the impedance of the load L; for example, 51.5 ohms.

At frequencies substantially above and below the resonant frequency of the cavities, energy is transmitted from the source S to the junction 4. Since it can be shown that the impedance reflected into the coupling loop of a half wavelength resonant cavity is:

$$Z_1=\frac{S_1^2}{\dfrac{S_o^2}{Z_2}+Z_\infty \tanh \gamma l}$$

where $Z_1$=the impedance reflected into the input coupling loop $S_1$=the mutual coupling impedance between the input loop and the cavity resonator $S_o$=the mutual coupling impedance between the output loop, if any, and the cavity resonator $Z_2$=the impedance of the output loop termination referred to the output loop, if any $Z_\infty$=the character impedance of the cavity resonator $\gamma$=the complex propagation constant of the cavity resonator $l$=the effective electrical length of the cavity resonator it follows that the impedances reflected into the coupling loops 9, 10, 13 at frequencies off resonance can be made very small by the proper choice of loop coupling and cavity resonator. This low impedance reflected through the quarter wavelength line sections 6, 7, 8 appears as a very high impedance at junctions 4, 5, 1. Because of the high impedance reflected at these junctions, frequencies above and below resonance are transmitted over line sections 2 and 3 to the load L without excessive reflections and with only a very small amount of energy being coupled with line section 6 to line section 7 through the series cavity 11. Hence, for these frequencies, the network behaves as a uniform transmission line with high shunting impedances at junctions 4, 1, 5, the useful frequency range being determined by the degree that the reflections from the shunting impedances can be tolerated.

At or very near the resonant frequency of the cavities 11, 12, the expression given above for $Z_1$ shows that, if the losses in the cavity 11 are small and if the input and output loops are equally coupled, then $Z_1 \approx Z_2$. Frequencies at or very near resonance are, therefore, transmitted through the cavity 11 in their entirety, except for the loss in the cavity itself, from line section 6 to line section 7 and thence to load L. Since the cavity 12 is resonant at or very near these same frequencies as well, and since it has no output coupling loop, it follows from the above expression that the impedance coupled into the coupling loop 13 is a very high impedance equal to $$\frac{S_1^2}{r}$$

where $r$ is the effective self-resistance of the tank. This high impedance is reflected through line section 8 and appears as a very low impedance at junction 1. When reflected through the quarter wavelength line sections 2, 3, the very low impedance appears as a very high impedance at junctions 4 and 5. Frequencies at or very near resonance are, therefore, hindered from being transmitted over this branch line 2, 3 and instead are transmitted mainly through line 6, 7 through the series cavity 11.

Inasmuch as the effective length of both branches is the same; that is, approximately $\lambda/2$ at the resonant frequency, and inasmuch as there is an additional 180 degree phase reversal due to the relative orientation of the loops in the series cavity 11, this network provides a means for reversing the phase of the energy at the resonant frequency while not reversing the phase at frequencies substantially above and below the resonant frequency.

The characteristics of the network of Figure 1 at frequencies near resonance are further controlled by the effective coupling of the cavities to the transmission line through the coupling loops. For instance, with low loss cavities and with the loop of the shunt cavity 12, coupled to the system with about twice the coupling that each loop 9, 10 of the series cavity 11 is coupled to the cavity, the system remains essentially matched at all frequencies near resonance and far from resonance over a wide band of frequencies as may be shown by actual characteristic curves of the voltage standing wave ratio plotted against frequency.

Another modizcation of the circuit of Figure 1 is shown in Figure 2 whereby the 180° phase reversal through the series cavity branch of the network, is obtained by adding an additional half wavelength or odd multiple thereof of transmission line 14 in the series cavity 15 branch line and with the loops 16, 17 oriented in such a manner as to introduce 0° phase shift between the loops rather than the 180° phase shift previously sought. Conductive coupling, as shown in Figure 5 by the connections 16′ and 17′, between the cavity and the transmission line sections 6′ and 7′ may also be used in this variation of the circuit.

A still further modification of this circuit is shown in Figure 6 in which capacitive couplings 18, 19, 20 are used to couple the cavities 21, 22 to the transmission line sections 23, 24, 25. Here, transmission line sections 23, 24, 25 are electrically equivalent to one-half wavelength or multiples thereof line sections in order that the same impedance relationships shall exist at junctions 26, 27, 28 due to the actions of the cavities 21, 22 as described above. Line sections 29, 30 remain one-quarter wavelength or odd multiples thereof line sections.

One embodiment of the invention described above is shown in Figure 4. This figure shows a system for feeding an antenna system from two transmitters with a low interaction between the two transmitters. This circuit makes use of a hybrid 103, for example, as described in U.S. Patent application S.N. 175,694, now U.S. Patent No. 2,769,146. In this system, a transmitter 102, for instance the visual transmitter of a standard television station, is connected at parallel feed input 104 and another transmitter 101, for instance the aural transmitter, is connected to the series feed input 105. The nature of the hybrid is such that if the impedances seen at 106 and 107 are essentially equal, the power will be divided into transmission lines 108 and 109 equally, and can travel to the antennas 110 and 111. With the visual transmitter connected to the input of 104, the two outputs at 106 and 107 will be in phase, and if the transmission line lengths were equal to the antenna, then the signals radiated from the antennas would be of the same phase producing a beam whose magnitude is at a maximum in the horizontal plane. The output signals at 106 and 107, from the aural transmitter 101, however, would be 180 degrees out of phase with each other. If these signals were then transmitted along the same length transmission line directly to the antennas, they would result in the two antennas 110 and 111 being fed out of phase and would produce a beam with a null in the horizontal plane. Since it is desirable to have the beams alike in order to cover the same areas, the phase of the aural signal in one output branch must be shifted 180 degrees. This may be accomplished by connecting the circuit shown in the right of Figure 4 similarly as shown in Figure 1.

Another embodiment of my invention is shown in Figure 3, wherein the two output transmission lines 201 and 202 are connected to a second hybrid bridge at side terminals 203 and 204, respectively, the parallel feed input 205 of the hybrid feeding an antenna, the series feed input 206 of the hybrid terminating in a dummy load 207. The nature of this circuit is such that the signals which are of the same phase at junctions 203 and 204 will be transmitted to the antenna while signals that are out of phase will be transmitted to a dummy load 207. This arrangement is useful in such applications where it is desired to run only one transmission line to the antenna, and this application can reduce the cost of running two lines for a distance, for instance, of one thousand feet. Inasmuch as the isolation between the visual transmitter and the aural transmitter is a function only of the equality of the impedances at junctions 106 and 107 in Figure 4 and junctions 208 and 209 in Figure 3 and inasmuch as the circuit described in Figure 1 introduces a very low standing wave ratio, considerable isolation between the transmitters can be obtained.

A further advantage of these systems is that the impedance looking into the junctions 104 and 105 in Figure 4 and junctions 210 and 211 in Figure 3 are essentially independent of frequency. With proper selection of the parameters in the circuit shown in Figure 1, the envelope phase delay can be held to a small amount in the visual spectrum. This was shown by measurements on the circuits of Figure 3 with the cavities tuned to resonance of approximately 179.750 megacycles per second.

Having now described my invention, I claim:

1. Selective transmission apparatus comprising, an input junction, an output junction, a resonant cavity having a pair of coupling means for exchanging energy with external devices and presenting a very low impedance between said coupling means at a prescribed resonant frequency, input and output wave transmission conduits respectively connected from said input and output junctions to respective ones of said coupling means to effect a phase reversal for energy of said resonant frequency transmitted through said cavity, the electrical length of said conduits being selected so that the effective impedance of said cavity referred to said junctions is much higher than the characteristic impedance of said conduits at frequencies outside the spectrum centered about said prescribed frequency, a third wave transmission conduit having said characteristic impedance connected between said input and output junctions, and another cavity resonant at said prescribed frequency coupled to said third wave transmission conduit at a point such that the effective impedance of said another cavity referred to said junctions at said prescribed resonant frequency is much higher than said characteristic impedance.

2. Selective transmissions apparatus in accordance with claim 1 wherein the degree of coupling of said another cavity to said third conduit is substantially twice that afforded by each of said pair of coupling means.

3. Selective transmission apparatus in accordance with claim 1 and further comprising, a source of energy having spectral components within a relatively wide spectrum including said prescribed resonant frequency connected to said input junction, the impedance presented by said source being substantially equal to said characteristic impedance.

4. Selective transmission apparatus in accordance with claim 3 and further comprising a load substantially equal to said characteristic impedance connected to said output junction.

5. Selective transmission apparatus in accordance with claim 4 wherein said source includes a first source of energy having spectral components immediately adjacent to but outside of a narrow spectrum about said prescribed frequency, a second source having spectral components within said narrow spectrum, a hybrid junction having a series feed input, a parallel feed input and a pair of side terminals, first and second sources presenting said characteristic impedance and connected to said shunt feed input and said series feed input respectively, said input junction being connected to the one of said terminals, an antenna system, and means for coupling the other of said side terminals and said output junction to said antenna system.

6. A radio frequency selective phase shifting bandpass network having an input connection at one side and an output connection on the other side with first and second parallel connecting wave transmission paths, said first path comprising a first cavity resonant at a prescribed frequency, means coupling said first cavity in series with first and second line sections respectively coupled to said input and output connections, the effective electrical length of said first path differing from that of said second path by an odd multiple of 180 degrees at said selected frequency, said first path transmitting energy having spectral components within a narrow band about said selected frequency while rejecting energy with spectral components outside said spectrum, the length of said first and second line sections corresponding to that multiple of a quarter wavelength at said selected frequency which transforms the impedance at the cavity end of said line sections to impedances at said input and output connections respectively which are high compared to the impedance at said input and output connections for frequencies outside said spectrum, a second resonant cavity coupled by means including a third line section to said second path at a point thereof spaced from said input and output connections by a multiple of a quarter wavelength at said selected frequency, the length of said third line section corresponding to that multiple of a quarter wavelength at said selected frequency which transforms the impedance at the cavity end of said third line section to an impedance at said second path point which is low compared to the impedance at said point at said selected frequency.

7. A network in accordance with claim 6 wherein said means coupling said first cavity in series with said first and second line sections comprises loop coupling means for effecting a phase reversal for energy of said selected frequency passed through said cavity, and the length of each of said first and second line sections is substantially an odd multiple of a quarter wavelength at said selected frequency.

8. A network in accordance with claim 6 wherein said means coupling said second cavity to said second path point comprises loop coupling means at said third line section cavity end and the length of said third line section is substantially an odd multiple of a quarter wavelength at said selected frequency.

9. A network in accordance with claim 6 wherein said means coupling said first cavity in series with said first and second line sections comprises capacitive probes and the length of each of said first and second line sections is substantially an odd multiple of a half wavelength at said selected frequency.

10. A network in accordance with claim 6 wherein said means coupling said second cavity to said second path point comprises, a capacitive probe at said third line section end and the length of said third line section is substantially an odd multiple of a half wavelength at said selected frequency.

References Cited in the file of this patent

UNITED STATES PATENTS

| | | |
|---|---|---|
| 1,530,537 | Affel | Mar. 24, 1925 |
| 2,396,044 | Fox | Mar. 5, 1946 |
| 2,531,447 | Lewis | Nov. 28, 1950 |
| 2,702,371 | Sunstein | Feb. 15, 1955 |
| 2,763,839 | Fiet | Sept. 18, 1956 |
| 2,795,763 | Tillotson | June 11, 1957 |
| 2,816,270 | Lewis | Dec. 10, 1957 |

OTHER REFERENCES

Ragon: "Microwave Transmission Circuits," M.I.T. Radiation Lab. Series, 1948, vol. 9, pages 645–716.